United States Patent [19]

Terasawa

[11] 4,276,554

[45] Jun. 30, 1981

[54] INK JET MECHANISM FOR PURGING AND ACTIVATING

[75] Inventor: Koji Terasawa, Fuchu, Japan

[73] Assignee: Canon Kabushiki Kaisha, Tokyo, Japan

[21] Appl. No.: 109,277

[22] Filed: Jan. 3, 1980

[30] Foreign Application Priority Data

Jan. 24, 1979 [JP] Japan .................................... 54/7568

[51] Int. Cl.[3] ............................................ G01D 15/18

[52] U.S. Cl. .................................... 346/140 R; 346/75

[58] Field of Search ........................... 346/75, 140 PD

[56] References Cited

U.S. PATENT DOCUMENTS 4,123,761 10/1978 Kimura et al. ................ 346/140 PD
4,170,016 10/1979 Geil ................................ 346/140 PD
4,223,322 9/1980 van Raamsdonk ........... 346/140 PD

*Primary Examiner*—George H. Miller, Jr.
*Attorney, Agent, or Firm*—Fitzpatrick, Cella, Harper & Scinto

[57] ABSTRACT

An ink jet mechanism is disclosed which is able to recover an ink jet head from nozzle blockage, meniscus retrogradation or other functional failure. The mechanism includes a diaphragm and a device for generating an electric signal. The signal generating device detects the application of pressure on the diaphragm and generates an electric signal in response to it.

4 Claims, 4 Drawing Figures

INK JET MECHANISM FOR PURGING AND ACTIVATING

BACKGROUND OF THE INVENTION

1. Field of the Invention

The present invention relates to an ink jet mechanism and more particularly relates to such ink jet mechanism which is able to correct the functional failure of an ink jet head such as blockage of the nozzle and retrogression of meniscus.

2. Description of the Prior Art

In an ink jet type of printer, functional failures are often caused by blockage of nozzle and retrogradation of meniscus. To restore the function of the ink jet head to its original proper state, some particular measure must be taken. A method hitherto used most commonly for this purpose is to apply pressure onto the ink. However, this solution involves the use of a large mechanism comprising a pressure regulating apparatus, driving apparatus and others. Furthermore, many switches are required.

SUMMARY OF THE INVENTION

Accordingly, it is a general object of the present invention to eliminate the disadvantages involved in the prior art mechanism mentioned above.

It is is more specific object of the invention to provide a novel mechanism for achieving the general object which mechanism is compact in form and simple in structure.

Other and further objects, features and advantages of the invention will appear more fully from the following description taken in connection with the accompanying drawings.

DESCRIPTION OF THE PREFERRED EMBODIMENTS

Figure 1:
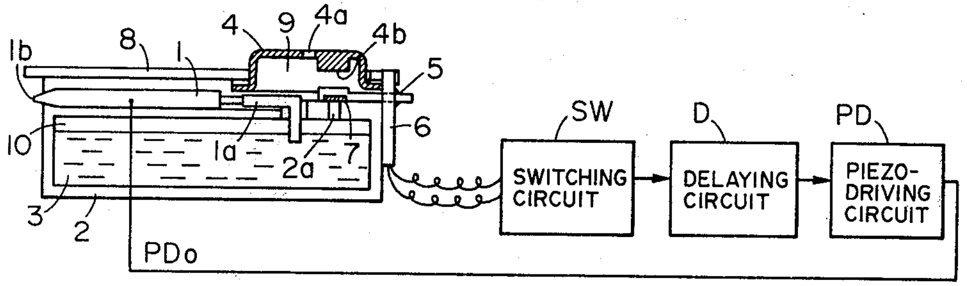
FIG. 1 is a schematic sectional view of an ink jet mechanism showing a preferred embodiment of the invention.
Figure 2:
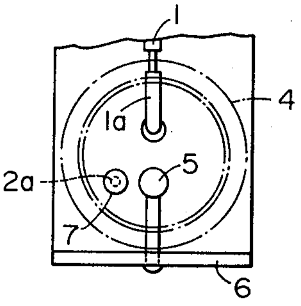
FIG. 2 is a top plan view thereof.
Figure 3:
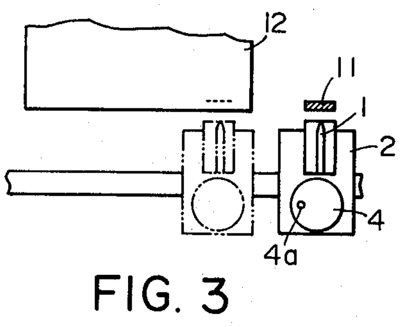
FIG. 3 is a partial top plane view of the main body of a recording apparatus.

In FIGS. 1 through 3, the reference numeral 1 designates an ink jet nozzle. The nozzle 1 has a pipe 1*a* extending rearwardly to an ink tank 2 containing therein ink 3. The free end of the pipe 1*a* is immersed in the ink 3. From the tip end 1*b* of the nozzle 1 are jetted ink droplets under the action of piezo-electric element or the like in a manner known per se to effect printing. The nozzle tip 1*b* often suffers from blockage and meniscus retrogradation. In such instance, the nozzle 1 sometimes is unable to jet ink droplets even when a print instruction pulse is applied to the piezo-electric element. To remove the trouble it was hitherto been required to provide a particular mechanism for applying a pressure to the ink 3 in the ink tank 2. However, such mechanism according to the prior art has the disadvantages mentioned above.

According to the invention no particular mechanism is required to remove the trouble and instead the same function is obtained by making use of an existing member, that is, a diaphragm switch conventionally used in a key board. The air exhaust function of a diaphragm switch is used to pressure the ink in the invention.

This diaphragm switch is designated by 4 in the drawings. The diaphragm switch 4 is made of electrically conductive rubber or the like and has an opening 4*a* through which air is allowed to enter the interior of the diaphragm to accelerate the elastic restoration of the latter. 5 is a fixed contact passing through a print substrate plate 6. The ink tank 2 has a pressure passage bore 2*a* and a filter 7 is disposed on the bore 2*a*. The filter 7 prevents dust and other foreign matter from coming into the ink tank 2 and also prevents back flow of the ink 3 which may make the fixed contact dirty. The diaphragm is suitably fixed to the print plate 6, supporting plate 8 etc. in such manner that a movable contact 4*b* is allowed to move upward and downward.

The diaphragm 4 is composed of various key switches including power source switch, print mode setting switch, ink test jet instruction switch etc. When the diaphragm 4 is pushed down while its opening 4*a* being closed by the operator's finger or the like, air 9 is forced to flow into the ink tank 2 through the pressure passage 2*a*. This increases the pressure of air 10 within the ink tank 2. As a result, ink 3 in the pipe 1*a* rises up and presses towards the nozzle tip. By this pressurized flow of ink, the trouble of nozzle blockage and/or meniscus retrogression is removed and the normal function of the nozzle is recovered. The amount of ink to be pushed out for this purpose can be suitably set as desired.

Also, by this pushing operation of the diaphragm 4, the conductive rubber contact 4*b* is brought into contact with the fixed contact 5 to close a key signal circuit not shown. Thus, an electric signal corresponding to the key switch then pushed is issued to perform the corresponding operation. For example, when a power source switch is keyed on, the power source is turned on by means of a signal issued therefrom. In this manner, a switching operation for setting the apparatus to an operational position is used also for applying a pressure to the ink within the ink tank. Namely, the compressed air generated by a switching operation is introduced into the ink tank to pressure the ink 3. Since a push button switch serves the two purposes of switching operation and ink pressuring operation, the mechanism can be simplified to a great extent.

It case that the key switch used also to apply a pressure of the ink 3 is an ink test jet instruction switch, it is preferable to carry out the test jet in a certain waiting position after the end of an ink pressuring mode. To this end, a signal for driving, for example, a piezo-electric element is issued to conduct a test of ink jet after the diaphragm 4 has been almost restored to its original state shown in FIG. 1. When the diaphragm 4 is restored to its original state, the operator keeps his finger from the opening 4*a* to let it open. Air flows rapidly into the switch room, which accelerates the restoration of the diaphragm 4 and also serves to prevent any backdown of the ink 3 once pushed up in the pipe 1*a*.

Piezo driving signal PDO is obtained through a switching circuit and a delaying circuit. The switching circuit SW detects the opening of contact between the two contacts 4*b* and 5 as soon as the movable contact 4*b* begins departing from the fixed contact 5. The delaying circuit D commences operation a certain predetermined time after the time point of the detection. PD is a piezo driving circuit.

Ink jet testing is preferably conducted at the home position of nozzle in a manner to cause ink to jet against an ink absorption plate 11 provided for absorbing unnecessary ink as shown in FIG. 3. By doing so, a good observation of test result can be assured. Preferably the absorption plate 11 is colored in white and is mounted for removal to allow easy exchange of the used plate for a new one. Material for the absorption plate can be selected suitably from various known materials having high absorbability. Alternatively, an ink jet test may be carried out against the right hand end portion of a recording medium 12 as suggested by phantom in FIG. 3.

Figure 4:
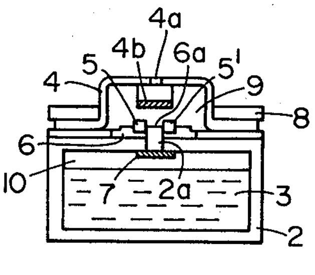
FIG. 4 is a view similar to FIG. 1, this view showing another embodiment of the embodiment.

FIG. 4 shows another embodiment of the invention.

In this second embodiment, the diaphragm 4 is made of insulating rubber and only the contact 4b is made of electrically conductive rubber or coated with an electrically conductive paint layer. Filter 7 is provided not on the pressure air passage 2a but under the passage 2a. Another change is found in an opening 6a formed in the print substrate plate 6. A pair of fixed contacts 5 and 5' are disposed opposed to each other relative to the opening 6a. These contacts 5 and 5' are formed as electrically conductive patterns formed on the print substrate plate 6. The print substrate plate 6 may have an extension on which various electric circuits such as photo elements for detecting the position of the nozzle and for speed control can be placed.

While the invention has been particularly shown and described with reference to preferred embodiments thereof, it will be understood by those skilled in the art that the foregoing and other changes in form and details can be made therein without departing from the spirit and scope of the invention.

What I claim:

1. An ink jet mechanism comprising:

an ink jet head;

a diaphragm for recovering said ink jet head from nozzle blockage and meniscus retrogradation when pressure is applied; and means for generating an electric signal in response to a pressing operation of said diaphragm.

2. An ink jet mechanism according to claim 1 wherein said electric signal contains information of power source cut-in.

3. An ink jet mechanism according to claim 1 wherein said electric signal contains information of print mode setting.

4. An ink jet mechanism according to claim 1 wherein said electric signal contains test jet instruction information of said ink jet head.

* * * * *

UNITED STATES PATENT AND TRADEMARK OFFICE

CERTIFICATE OF CORRECTION

PATENT NO. : 4,276,554

DATED : June 30, 1981

INVENTOR(S) : KOJI TERASAWA

It is certified that error appears in the above—identified patent and that said Letters Patent is hereby corrected as shown below:

Column 1, line 28 change "is" (second occurrence) to --a--; line 60, change "was" to --has--.

Column 2, line 21, change "being" to --is--.

Column 3, line 2, after "of" insert --the--.

Claim 1, line 7, change "of" to --on--.

Signed and Sealed this

*Fifteenth* Day of *September 1981*

[SEAL]

*Attest:*

GERALD J. MOSSINGHOFF

*Attesting Officer* *Commissioner of Patents and Trademarks*